United States Patent [19]
Kao et al.

[11] Patent Number: 5,267,300
[45] Date of Patent: Nov. 30, 1993

[54] HIGH SPEED DIGITAL DATA TRANSMISSION OVER SWITCHED VOICE NETWORK

[75] Inventors: Ming-Luh Kao, Miami; Jerry A. Miller, Sunrise, both of Fla.

[73] Assignee: Racal-Datacom, Inc., Sunrise, Fla.

[21] Appl. No.: 772,514

[22] Filed: Oct. 7, 1991

[51] Int. Cl.$^5$ .................. H04M 11/00; G06F 11/00; H04B 17/00

[52] U.S. Cl. ........................ 379/93; 379/94; 371/20.4; 375/10; 370/13

[58] Field of Search ............ 379/93, 94, 97, 98, 379/22, 27, 29, 100; 375/10; 371/20.4, 67.1; 370/13, 14, 32.1

[56] References Cited

U.S. PATENT DOCUMENTS

| | | | |
|---|---|---|---|
| 3,596,245 | 7/1971 | Finnie | 371/20.4 |
| 4,549,049 | 10/1985 | Guidoux | 375/10 |
| 4,642,697 | 2/1987 | Wada | 379/100 |
| 4,956,860 | 9/1990 | Murata | 379/100 |
| 4,961,185 | 10/1990 | Sawada | 379/100 |
| 5,134,611 | 7/1992 | Steinka et al. | 379/94 |

Primary Examiner—Jin F. Ng
Assistant Examiner—Jason Chan
Attorney, Agent, or Firm—William A. Newton; Jerry A. Miller

[57] ABSTRACT

A dialed telephone connection can be implemented as an end-to-end digital connection by virtue of switched voice transmission facilities becoming more prevalent. If such a connection is detected, it is possible to transmit digital data over the connection at a much higher rate than using analog technology. A dialed voice call is emulated to set up such a connection and the connection is then tested to determine if it is end-to-end digital. If so, high speed digital data can be passed. If not, the connection is broken and then reestablished repeatedly until such a digital connection is found. In one embodiment, the calls are alternately initiated from each of the two parties involved in attempts to increase the likelihood of achieving an end-to-end digital connection. If no such connection can be obtained after a reasonable number of tries, an analog communication session can be established.

10 Claims, 4 Drawing Sheets

HIGH SPEED DIGITAL DATA TRANSMISSION OVER SWITCHED VOICE NETWORK

BACKGROUND

1. Field of the Invention

This invention relates generally to the field of data communication. More particularly, this invention relates to transmission of high speed digital data over switched digital voice networks.

2. Background of the Invention

Switched digital networks are becoming increasingly prevalent and are commonly used for voice transmission. As these networks become more and more common, there is a substantial likelihood that a voice call between two geographical locations will be digital from one end to the other. Unfortunately, present dial-up data communication equipment does not take advantage of this fact.

Dial-up data communication normally uses a modem to convert digital data to analog form for transmission. The analog information is then converted back to digital at the receiving end. In this scenario, data transmission rates are currently limited to approximately 19.2 Kbps (assuming no data compression). However, if an end-to-end digital connection is made, up to 56 Kbps (currently) of digital bandwidth is used to carry this information using PCM (Pulse Coded Modulation). Thus, the available bandwidth is inefficiently used. The present invention provides a mechanism for utilizing this available bandwidth for data transmission.

SUMMARY OF THE INVENTION

It is an object of the present invention to provide an improved data communication method.

It is a feature that the present invention provides enhanced bandwidth for dial-up data communication when end-to-end digital connections are made.

It is an advantage that the present invention can enhance data throughput by nearly 200 percent over currently available techniques.

It is a further advantage of the present invention that substantial cost savings in telecommunications can be achieved.

These and other objects, advantages and features of the invention will become apparent to those skilled in the art upon consideration of the following description of the invention.

In one embodiment of the present invention a dialed telephone connection can be implemented as an end-to-end digital connection by virtue of switched voice transmission facilities becoming more prevalent. If such a connection is detected, it is possible to transmit digital data over the connection at a much higher rate than using analog technology. A dialed voice call is emulated to set up such a connection and the connection is then tested to determine if it is end-to-end digital. If so, high speed digital data can be passed. If not, the connection is broken and then reestablished repeatedly until such a digital connection is found. In one embodiment, the calls are alternately initiated from each of the two parties involved in attempts to increase the likelihood of achieving an end-to-end digital connection. If no such connection can be obtained after a reasonable number of tries, an analog communication session can be established.

A method for establishing a communication link for transmission of digital data in a voice network, includes the steps of (a) establishing a dial-up communication link between a source unit and a destination unit; (b) testing the communication link to determine if the link functions as an end-to-end digital link; (c) if the link functions as an end-to-end digital link, initiating a digital data communication session; and (d) if the link does not function as an end-to-end digital link, terminating the dial-up communication link. The steps (a) through (d) are preferably repeated until a dial-up communication link is established which functions as an end-to-end digital link. The establishing step can be alternately performed by the source unit and the destination unit.

In another aspect of the present invention, a method for establishing a communication link for transmission of digital data in a voice network, includes the steps of: (a) designating a source unit to be a calling unit and a destination unit to be a called unit; (b) establishing a dial-up communication link by placing a call from the calling unit to the destination unit; (c) testing the communication link to determine if the link functions as an end-to-end digital link by transmitting a test signal over the link and comparing the test signal after receipt with a stored version of the test signal to determine if the test signal was passed by the link without introduction of errors, error free receipt of the test signal being an indication that the link is end-to-end digital; (d) if the link functions as an end-to-end digital link, initiating a digital data communication session; (e) if the link does not function as an end-to-end digital link, terminating the dial-up communication link, incrementing a counter and reversing the designations of the calling and called units; (f) repeating steps (b) through (e) until either a dial-up communication link is established which functions as an end-to-end digital link or the counter reaches a maximum value.

An apparatus, according to the present invention, for transmitting high speed data over a digital voice network, includes a dialer for establishing a dial-up communication link having first and second ends over the network. The link is tested to determine if the dial-up communication link is end-to-end digital. A digital transceiver transmits and receives digital data over the communication link if the testing means determines that the communication link is end to end digital.

A method, according to the present invention, for determining if a communication link having first and second ends is end-to-end digital includes the steps of: storing samples of a digitally encoded analog signal at the first and second ends; transmitting the stored samples from the first end to the second end; receiving the transmitted samples at the second end; and comparing the received samples with the stored samples at the second end, any differences between said samples being indicative that the link is not end-to-end digital.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
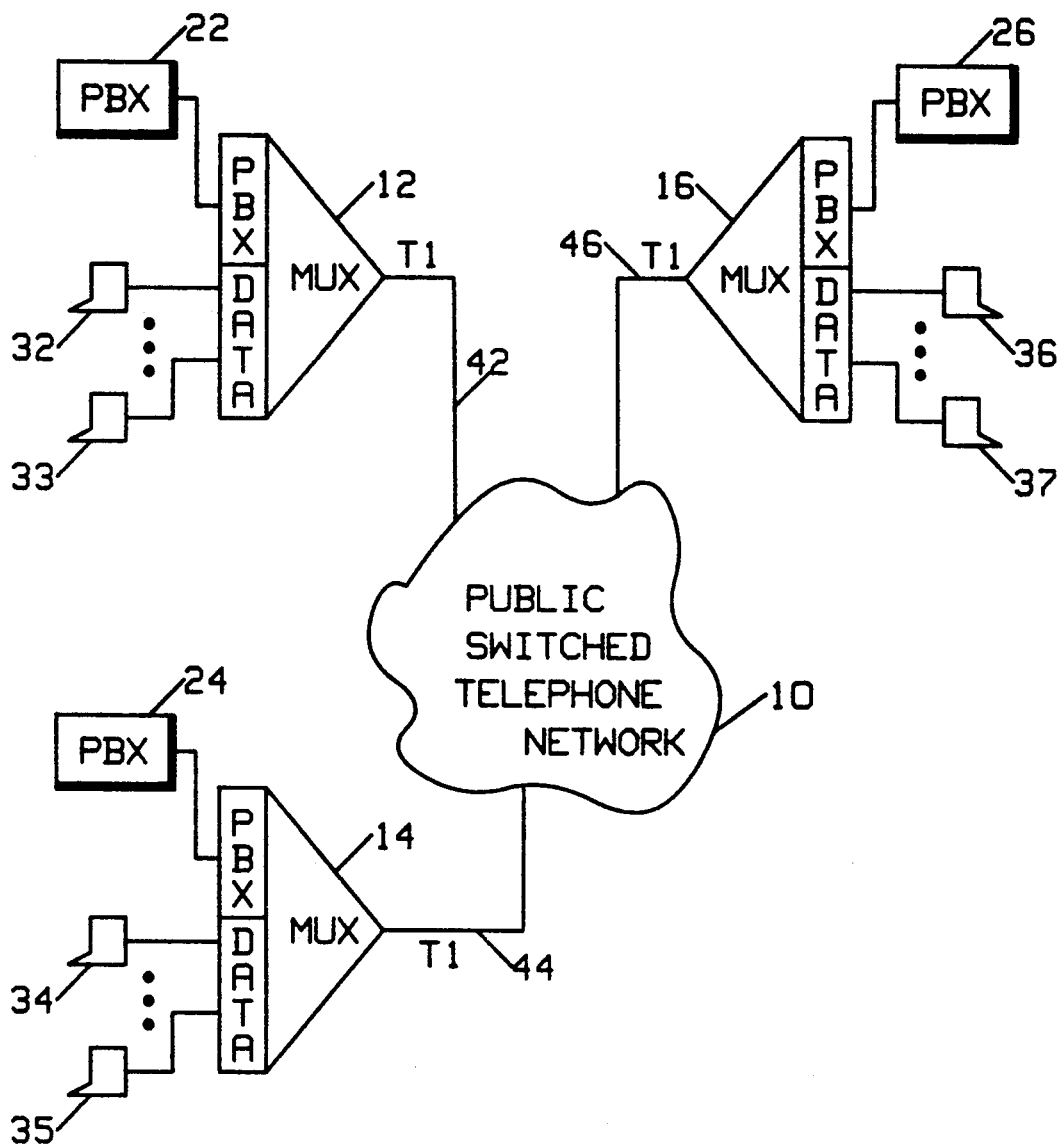
FIG. 1 is a diagram of a switched digital voice communication network.

Turning now to FIG. 1, an example network using the present invention is shown. A public switched telephone network (PSTN) 10 (such as U.S. Sprint's Virtual Private Network TM) is used to provide the basic transportation, switching and routing of information. At each of the three locations shown, a multiplexer 12, 14 and 16 combines voice information from a private branch exchange (PBX) 22, 24 and 26 with data from data terminal equipment (DTE) 32, 33, 34, 35, 36 and 37 for transmission over T1 lines 42, 44 and 46 to PSTN 10. Of course, this particular network configuration is only intended to be illustrative and should not be considered limiting. For example, other types of digital lines could be used, and more or fewer DTEs may be present.

In this embodiment, information from the PBX is passed along transparently to the network and handled in a conventional manner. Data from the DTEs are handled somewhat differently. According to the present invention in a broad description, a call is set up from a DTE as if it were a voice call. A test is then carried out to determine if an end-to-end digital connection has been established. This can be accomplished by checking for the existence of any tandem encoding along the circuit. If an end-to-end digital connection was obtained, high speed digital data can be directly transported over the network. If part of the connection is analog, the call is attempted again in an effort to establish a different route (connection) which is hopefully end-to-end digital.

Figure 2A:
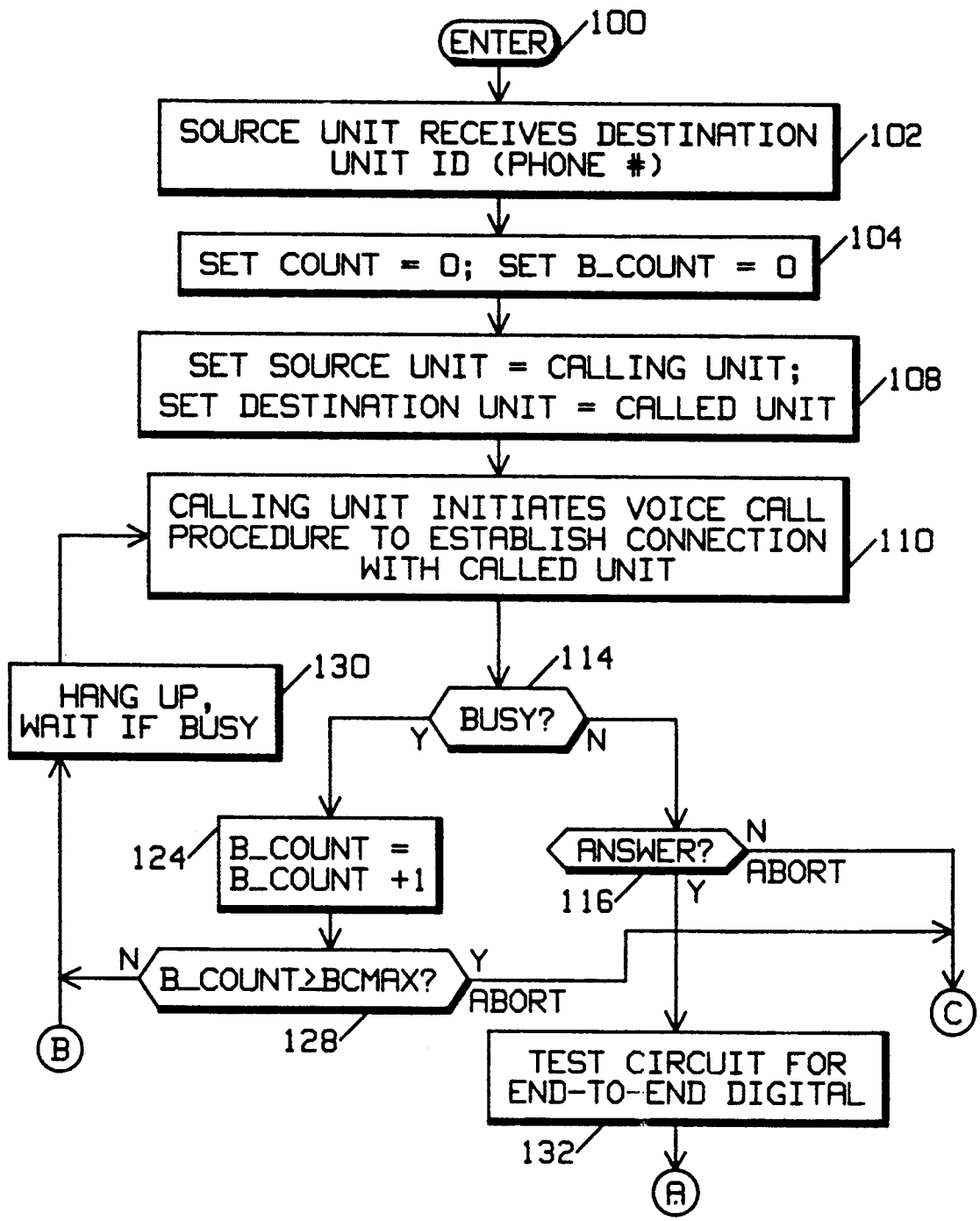
FIG. 2A shows a flow chart a first portion of the operation of the present invention.
Figure 2B:
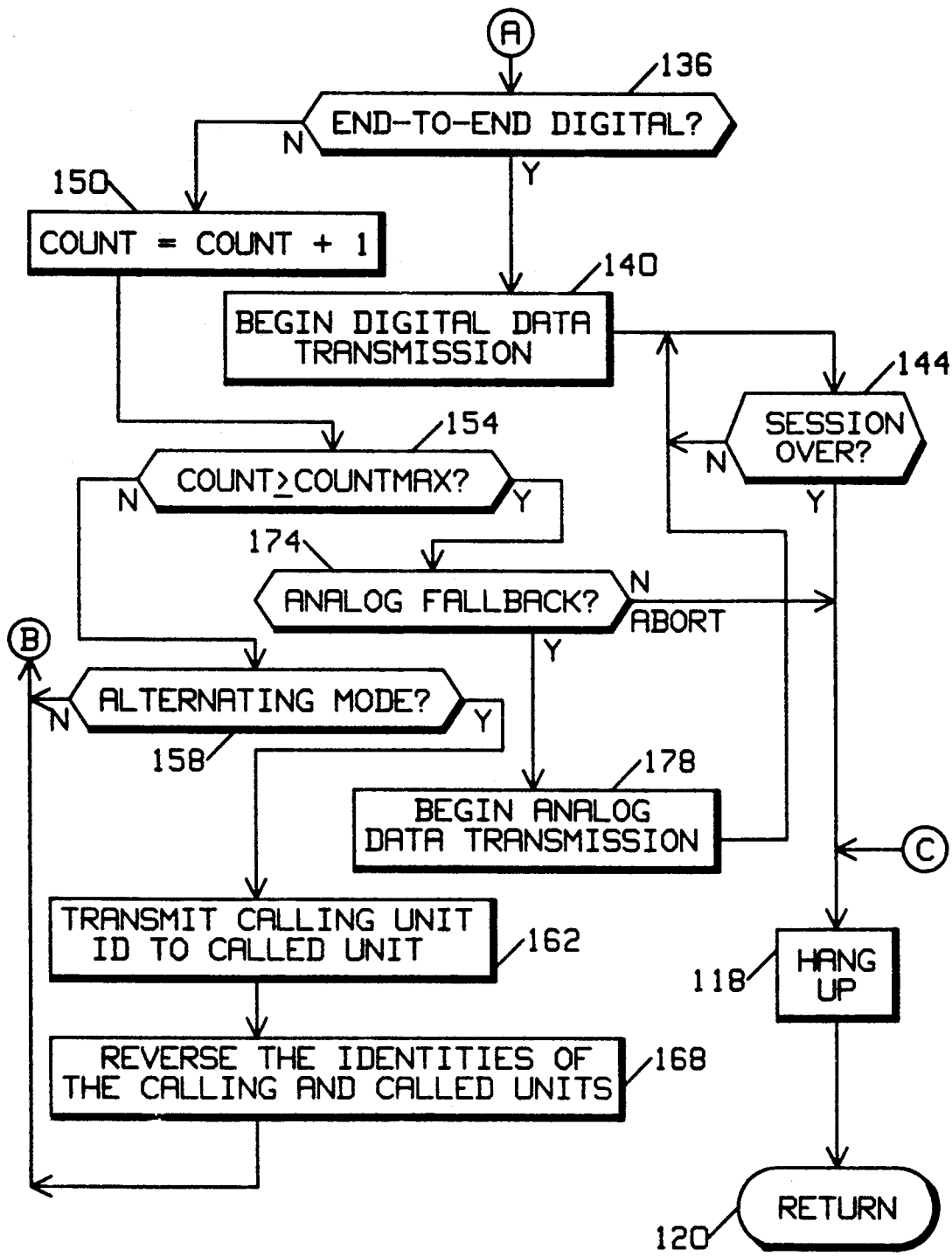
FIG. 2B shows a flow chart of a second portion of the operation of the present invention.

In order to more clearly understand the present invention, consider FIG. 2 which is a flow chart of the operation of the invention. For purposes of this description, the following terminology will be used:

Calling unit - the unit currently placing a call to the called unit.

Called unit - the unit being called by the calling unit.

Source unit - the unit which originates a communication session by placing the call or the first of a sequence of calls.

Destination unit - the unit which the source unit is attempting to contact for a communication session by a call or sequence of calls.

Several embodiments of the present invention are contemplated and described by the flow chart of FIG. 2. Those skilled in the art will understand that all embodiments contemplated by FIG. 2 need not be present in a single device. The above definitions are established primarily for understanding of the alternating mode to be described. In simpler embodiments, such definitions are not generally needed since the terminology would be self evident.

The process of initiating a call begins at 100 with a source unit receiving a destination unit identifier at step 102. This corresponds to a user entering a phone number or selecting one from a list of choices. Two counters are initialized to zero at 104, namely COUNT and B_COUNT. The variable COUNT represents the number of attempts made at finding an end-to-end digital connection. The variable B_COUNT represents the number of busy signals received when attempting to make a connection.

At step 108, the identities of the source unit and destination unit are set at calling unit and called unit respectively. The purpose of this will become clear later. Then, at step 110, the calling unit initiates a call to the called unit. This is accomplished using the same procedures which would be used for setting up a voice call via a telephone set over the switched voice network. That is, a voice call setup is emulated. If a busy signal is not received at 114 and no answer is obtained at 116, the session is aborted. The unit hangs up at 118 and the routine terminates at 120. In some embodiments, a second try may be attempted or an error message may be displayed. Other variations will occur to those skilled in the art.

If a busy signal is received at 114, the B_COUNT counter is incremented at 124 to track the number of call setups resulting in busy signals. B_COUNT is compared with a predetermined or user selected maximum value designated BCMAX at 128. When B_COUNT reaches this maximum value, the routine is aborted to step 120. As long as this threshold is not exceeded, control returns to step 110 after hanging up at step 130, where the calling unit makes an additional attempt to establish a connection after a suitable delay time to allow the busy line to become free (e.g. one minute).

Once a connection is made, as indicated by an answer at step 116, the connection is tested to determine if an end-to-end digital connection has been established at step 132. If the connection is end-to-end digital at 136, a digital data communication session is begun at step 140. The session continues until one party terminates the session. When this is detected at 144, the routine terminates at 120.

If it is determined that the connection is not end-to-end digital at step 136, the counter COUNT is incremented at 150 and COUNT is compared with a predetermined or user selected maximum count, designated COUNTMAX, at step 154. If COUNT is less than COUNTMAX at 154, the system initiates another attempt at establishinq an end-to-end digital connection. According to the present invention, this can be accomplished in one of several ways. In the simplest embodiment, control simply returns to step 110, after hanging up at step 130, where a second attempt is made. In another embodiment, the identity of the called and the calling units are reversed so that calls are alternately placed from each unit until an end-to-end digital connection is made. It is believed that with some telephone circuits, this technique of alternating sources of the call will increase the overall likelihood of achieving an end-to-end digital connection. The alternating of sources for call origin is the reason for the designations of source, destination, calling and called, and is not required otherwise.

The alternation of sources for call origination is designated "alternating mode" for purposes of this document and may be provided as an optional feature as illustrated in FIG. 2. By making such a feature optional, the user can elect to disable the alternating mode if the source of the call is important for billing or other purposes. If the alternating mode is not enabled at step 158, control returns to step 110 where another call is initiated after hang up at 130.

If the alternating mode is enabled at 158, the calling unit's identification (e.g. phone number) is transmitted, using analog tones such as DTMF or any other suitable signalling technique, to the called unit at step 162 so that the called unit knows the identity of the calling unit for purposes of initiating the next try. The identities of the calling and called units are then reversed at step 168. That is, if the source unit is defined as the calling unit, it will be changed to the called unit and vice versa; and, if the destination unit is defined as the called unit, it will be changed to the calling unit and vice versa. Control then returns to step 110 via step 130 where the next connection is initiated from the opposite end as that of the previous call after hanging up at 130.

In another optional mode of operation of the present invention, data communication may be undertaken using analog modem or modec technology in the event an end-to-end digital connection is not obtained after a reasonable number of tries. (A modec is a device which is similar to a modem except its output is digital pulse code modulation rather than analog). This feature is referred to as "analog fallback" (even though if a modec is used, the output is actually PCM) and is undertaken if COUNT equals or exceeds COUNTMAX at step 154. If the analog fallback mode is not enabled at step 174, the attempt to establish end-to-end digital connection is simply aborted and the routine returns at 120, preferably with an error message. If the analog fallback feature is enabled at step 174, analog data transmission is initiated at step 178. Control then passes to step 144 which monitors the transmission session. When the session ends, the routine hangs up at 118 and terminates normally at 120.

Several techniques can be used to determine if an end-to-end digital connection is obtained according to the present invention. For example, a known high frequency test pattern (a PCM signal representing an analog signal containing frequency components near the band edge of analog circuits, e.g. having components around 2800 Hz) can be transmitted from the calling unit to the called unit (or vice versa). An identical signal is stored at the called unit for comparison with the received test signal. If received error free at the called unit, an end-to-end digital connection can be assumed. It may then be necessary to take steps to disable any echo cancellation along the path using known techniques.

Another preferred technique for determining if an end-to-end digital connection is obtained involves sending a PCM coded digital tone or other pattern from one end to the other. In the preferred embodiment, samples of a PCM coded 2100 Hz tone is stored at each unit in memory. When a connection is established, these coded samples are retrieved and transmitted to the remote unit repeatedly for a predetermined duration of time. At the receiving unit, a bit by bit comparison of the received samples is performed with the samples stored in the receiving units memory. If there is tandem encoding along the path, there will be digital-to-analog and analog-to-digital conversions in the path. Thus the circuit will not be end-to-end digital. In this event, there is a high likelihood that the received pattern will not identically match the transmitted pattern (due to differences in sampling times, noise, etc.) and the circuit will be rejected as not being end-to-end digital. The use of a 2100 Hz PCM coded tone also serves to disable any existing echo cancellers in the circuit. Thus, the tone should be transmitted for at least the minimum time required by specifications to disable any such echo cancellation.

Each of the above techniques depends upon minor distortions in analog channels (delay, jitter, amplitude, noise, etc.) corrupting the test signal at a point in the circuit where the signal is in analog form. Since even small changes in the signal will result in different PCM (Pulse Code Modulation) coding when converted back to digital, a difference will be detected. Such small changes in the signal are highly likely because of delays in the network causing differences in sampling times between digital-to-analog and analog-to-digital conversions. Signals which are relatively high in frequency, with respect to an analog telephone channel, and signals which are adjacent the band edges of an analog telephone channel are more prone to exhibiting such changes.

Figure 3:
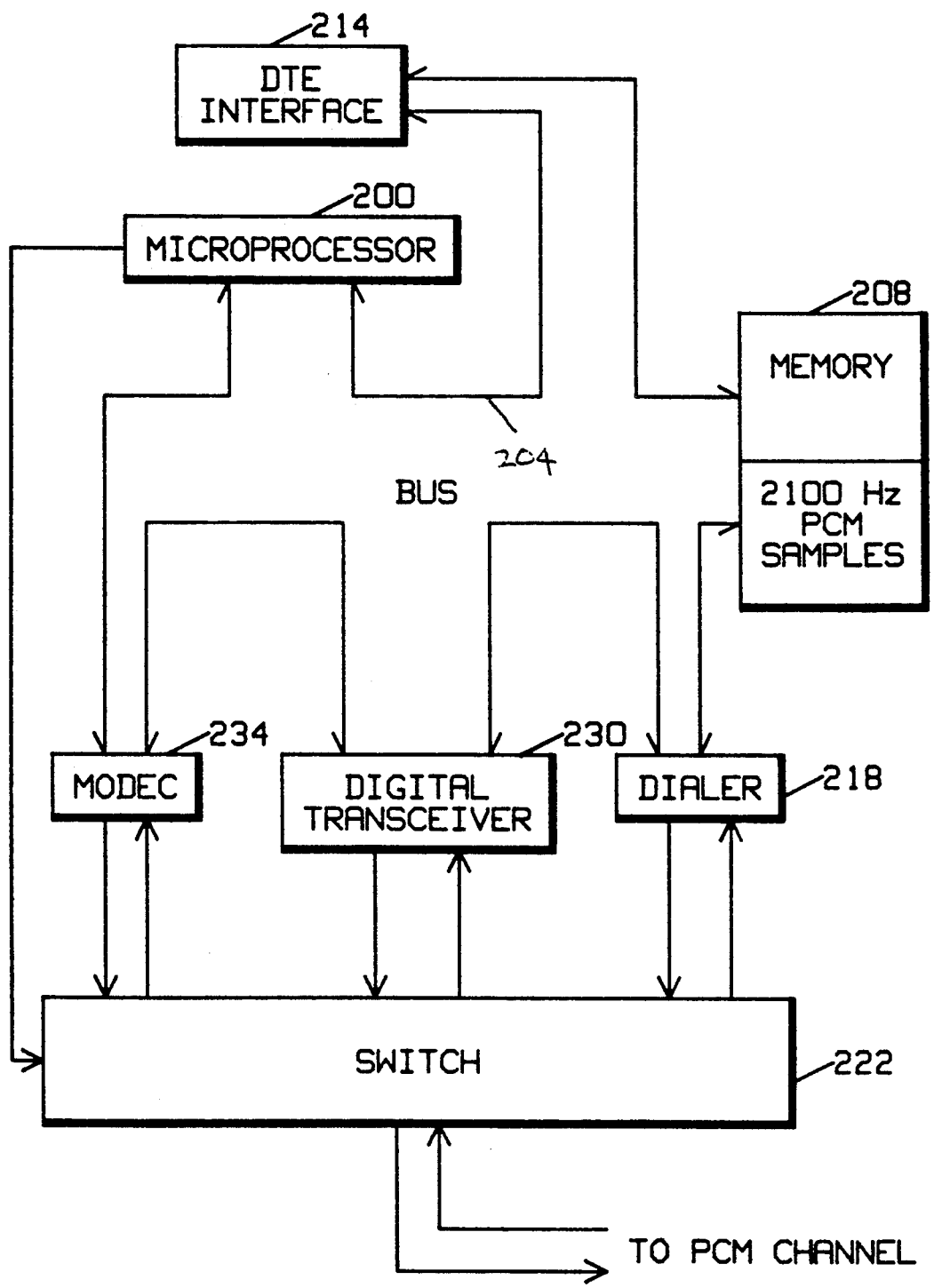
FIG. 3 is a block diagram of an embodiment of the present invention.

Turning now to FIG. 3, a block diagram of one hardware embodiment of the present invention is shown. This embodiment is based around a microprocessor 200 which is programmed in accordance with the flow chart of FIG. 2. Microprocessor 200 is coupled via a bus 204 to its memory 208. Memory 208 includes Read Only Memory (ROM) and Random Access Memory (RAM) in a conventional manner. The ROM memory of 208 includes, in this embodiment, a table of PCM samples of the 2100 Hz tone used to disable echo cancellers and test the communication link as described above, along with programming instructions.

Microprocessor 200 is also coupled to a DTE interface 214 which appropriately adapts to a data terminal or the like. This terminal is used to enter, options and commands to the microprocessor 200 as well as communication of data once a communication link is established.

When establishing a telephone connection, microprocessor 200 instructs a dialer 218 to transmit dialing signals through a switch 222 to a PCM channel of the multiplexer. Once the dial connection has been established, switch 222 is switched by the microprocessor 200 to a digital transceiver 230 which retrieves and transmits the 2100 Hz test samples to test the connection. The comparison operation at the receiving unit is carried out by the microprocessor 200 which compares incoming data with the stored PCM 2100 Hz samples. When an end-to-end digital connection is established, data to and from the DTE is passed through the digital transceiver 230. When analog fallback is needed, switch 222 is switched by microprocessor 200 to modec 234 which transmits and receives PCM coded analog signals (such as those which a modem would produce) representing the data. Of course, this embodiment is not to be limiting since many variations are possible.

Those skilled in the art will recognize that many variations are possible without departing from the present invention. For example, time-out protection can be incorporated. Also, variations of the method of manipulating the COUNT are possible. As disclosed, the COUNT is maintained at both the source and destination units in the alternating mode so that the attempt to establish a connection is terminated whenever either of the units reach COUNTMAX. Appropriate modification can be made to transmit the COUNT back and fourth if desired, or to maintain the count at a single location without departing from the invention. Also, the present invention is disclosed as part of a multiplexer which multiplexes PBX information with data from DTEs, but other embodiments, e.g. a separate unit which plugs between a DTE and a multiplexer, are equally possible and likely. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for establishing a communication link for transmission of digital data in a voice network, comprising the steps of:
   (a) establishing a dial-up communication link between a source unit and a destination unit;
   (b) testing said communication link to determine if the link functions as an end-to-end digital link;
   (c) if said link functions as an end-to-end digital link, initiating a digital data communication session;
   (d) if said link does not function as an end-to-end digital link, terminating said dial-up communication link;
   (e) if said link does not function as an end-to-end digital link, using said source unit and said destination unit for automatically repeating steps (a) through (d);
   (f) one of said units counting a number of dial-up communications links which are established and which do not function as end-to-end digital links;
   (g) said one unit comparing said number to a maximum value; and
   (h) one of said units automatically establishing an analog communication session if said number reaches said maximum value.

2. The method of claim 1, wherein said establishing step is alternately and automatically performed by said source unit and said destination unit.

3. The method of claim 1, wherein said establishing step is alternately and automatically performed by said source unit and said destination unit which are initially designated as calling unit and called unit respectively, by reversing the designation of said source and destination units to called and calling units respectively.

4. The method of claim 1, wherein said testing step comprises the steps of:
   transmitting a pulse coded modulation (PCM) sequence representing an analog signal having frequency components near the extremities of a bandwidth of an analog telephone circuit from a first end of said link to a second end of said link; and
   checking to see if said PCM sequence is received without errors at said second end of said link.

5. The method of claim 1, wherein said testing step comprises the steps of:
   transmitting a tone represented by a pulse coded modulation (PCM) coded sequence from a first end of said link to a second end of said link; and
   comparing said sequence at said second end of said link with a stored version of said sequence to see if said sequence is received without errors at said second end of said link.

6. The method of claim 5, wherein said tone is a 2100 Hz tone.

7. The method of claim 6, wherein said sequence is transmitted for a period of time to disable any echo cancellers present along said link.

8. A method for establishing a communication link for transmission of digital data in a voice network, comprising the steps of:
   (a) designating a source unit to be a calling unit and a destination unit to be a called unit;
   (b) establishing a dial-up communication link by placing a call from said calling unit to said destination unit;
   (c) testing said communication link to determine if the link functions as an end-to-end digital link by transmitting a test signal over said link and comparing the test signal after receipt with a stored version of said test signal to determine if said test signal was passed by said link without introduction of errors, error free receipt of said test signal being an indication that said link is end-to-end digital;
   (d) if said link functions as an end-to-end digital link, initiating a digital data communication session;
   (e) if said link does not function as an end-to-end digital link, terminating said dial-up communication link, incrementing a counter and reversing the designations of said calling and called units;
   (f) repeating steps (b) through (e) until either a dial-up communication link is established which functions as an end-to-end digital link or said counter reaches a maximum value.

9. The method of claim 8, further comprising the step of establishing an analog communication session if said counter reaches said maximum value.

10. The method of claim 8, wherein said test signal comprises a sequence of pulse coded modulation (PCM) coded 2100 Hz tone transmitted for a period of time to disable any echo cancellers along said link.

* * * * *